(12) United States Patent
Fu

(10) Patent No.: US 11,381,660 B2
(45) Date of Patent: Jul. 5, 2022

(54) SELECTIVE INFORMATION SHARING BETWEEN USERS OF A SOCIAL NETWORK

(71) Applicant: Advanced New Technologies Co., Ltd., Grand Cayman (KY)

(72) Inventor: Xiaozhen Fu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/366,801

(22) Filed: Jul. 2, 2021

(65) Prior Publication Data

US 2021/0337044 A1    Oct. 28, 2021

Related U.S. Application Data

(63) Continuation of application No. 16/039,006, filed on Jul. 18, 2018, now Pat. No. 11,057,492, which is a
(Continued)

(30) Foreign Application Priority Data

Jan. 19, 2016    (CN) .......................... 201610035517.3

(51) Int. Cl.
*H04L 67/60* (2022.01)
*G06F 16/435* (2019.01)
(Continued)

(52) U.S. Cl.
CPC ............ *H04L 67/32* (2013.01); *G06F 16/435* (2019.01); *G06F 16/9535* (2019.01); *G06Q 50/01* (2013.01); *H04L 29/08* (2013.01)

(58) Field of Classification Search
CPC ........... H04W 12/00503; H04W 4/029; H04W 4/021; H04W 4/70; H04L 67/1021
See application file for complete search history.

(56) References Cited

U.S. PATENT DOCUMENTS 9,064,284 B1 *  6/2015  Janiszeski .............. G06Q 40/06
9,338,242 B1    5/2016  Suchland et al.
(Continued)

FOREIGN PATENT DOCUMENTS

CN        102546656        7/2012
CN        103369009        10/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Joe Chacko
(74) *Attorney, Agent, or Firm* — Fish & Richardson P.C.

(57) ABSTRACT

A content acquisition request for acquiring content from the social networking service is received from a first terminal associated with a social networking service. The content acquisition request comprises a first location of the first terminal. A content recommendation message is received from a second terminal associated with the social networking service. The content recommendation message comprises a recommended content information and a second location of the second terminal. A server of the social networking service determines that (i) the first location of the first terminal and the second location of the second terminal are within a preset range, and (ii) a first time of the content acquisition request and a second time of the content recommendation message are within a preset time difference. In response, a target content associated with the recommended content information of the content recommendation message is transmitted by the server to the first terminal.

20 Claims, 6 Drawing Sheets

Related U.S. Application Data continuation of application No. PCT/CN2017/070800, filed on Jan. 10, 2017.

(51) Int. Cl.
  *G06F 16/9535* (2019.01)
  *H04L 65/40* (2022.01)
  *G06Q 50/00* (2012.01)

(56) References Cited

U.S. PATENT DOCUMENTS

| | | | |
|---|---|---|---|
| 2008/0262958 | A1 | 10/2008 | Ku et al. |
| 2012/0246267 | A1 | 9/2012 | Mallet et al. |
| 2012/0315927 | A1* | 12/2012 | Du .................. H04W 4/029 |
| | | | 455/456.3 |
| 2014/0115042 | A1 | 4/2014 | Yin |
| 2014/0123035 | A1 | 5/2014 | Liu et al. |
| 2014/0351377 | A1* | 11/2014 | Chen .................. G06Q 10/10 |
| | | | 709/217 |
| 2014/0359272 | A1 | 12/2014 | Hiltunen et al. |
| 2015/0012331 | A1 | 1/2015 | Carter et al. |
| 2016/0286371 | A1 | 9/2016 | Mu et al. |

FOREIGN PATENT DOCUMENTS

| | | |
|---|---|---|
| CN | 104009980 | 8/2014 |
| CN | 104079471 | 10/2014 |
| CN | 104135713 | 11/2014 |
| CN | 104699764 | 6/2015 |
| CN | 104954406 | 9/2015 |
| EP | 2814221 | 12/2014 |
| JP | 2001134519 | 5/2001 |
| JP | 2002133175 | 5/2002 |
| JP | 2003167997 | 6/2003 |
| JP | 2008287596 | 11/2008 |
| JP | 2015507295 | 3/2015 |
| JP | 2015122082 | 7/2015 |
| WO | WO 2013159639 | 10/2013 |
| WO | WO 2014154041 | 10/2014 |

OTHER PUBLICATIONS

European Extended Search Report in European Application No. 17740975.2, dated May 29, 2019, 9 pages.
International Search Report by the International Searching Authority issued in International Application No. PCT/CN2017/070800 dated Apr. 1, 2017; 8 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/070800, dated Jul. 24, 2018, 13 pages, (with English translation).
PCT Written Opinion of the International Searching Authority in International Application No. PCT/CN2017/070800, dated Apr. 1, 2017, 9 pages (with English translation).

* cited by examiner

600

RECEIVING, FROM A FIRST TERMINAL ASSOCIATED WITH A SOCIAL NETWORKING SERVICE, A CONTENT ACQUISITION REQUEST FOR ACQUIRING A CONTENT FROM THE SOCIAL NETWORKING SERVICE, THE CONTENT ACQUISITION REQUEST COMPRISING A FIRST LOCATION OF THE FIRST TERMINAL WHEN THE CONTENT ACQUISITION REQUEST IS GENERATED BY THE FIRST TERMINAL
602

RECEIVING, FROM A SECOND TERMINAL ASSOCIATED WITH THE SOCIAL NETWORKING SERVICE, A CONTENT RECOMMENDATION MESSAGE, THE CONTENT RECOMMENDATION MESSAGE COMPRISING A RECOMMENDED CONTENT INFORMATION AND A SECOND LOCATION OF THE SECOND TERMINAL WHEN THE CONTENT RECOMMENDATION MESSAGE IS GENERATED BY THE SECOND TERMINAL
604

DETERMINING, BY A SERVER OF THE SOCIAL NETWORKING SERVICE, THAT (I) THE FIRST LOCATION OF THE FIRST TERMINAL AND THE SECOND LOCATION OF THE SECOND TERMINAL ARE WITHIN A PRESET RANGE, AND (II) A FIRST TIME OF THE CONTENT ACQUISITION REQUEST AND A SECOND TIME OF THE CONTENT RECOMMENDATION MESSAGE ARE WITHIN A PRESET TIME DIFFERENCE
606

TRANSMITTING, BY THE SERVER TO THE FIRST TERMINAL, A TARGET CONTENT ASSOCIATED WITH THE RECOMMENDED CONTENT INFORMATION OF THE CONTENT RECOMMENDATION MESSAGE
608

FIG. 6

SELECTIVE INFORMATION SHARING BETWEEN USERS OF A SOCIAL NETWORK

CROSS-REFERENCE TO RELATED APPLICATIONS

This application is a continuation of U.S. patent application Ser. No. 16/039,006, now allowed, filed on Jul. 18, 2018, which is a continuation of PCT Application No. PCT/CN2017/070800, filed on Jan. 10, 2017, which claims priority to Chinese Patent Application No. 201610035517.3, filed on Jan. 19, 2016, and each application is hereby incorporated by reference in its entirety.

TECHNICAL FIELD

The present application relates to the field of communications technologies, and in particular, to service processing methods and apparatuses.

BACKGROUND

With rapid development of Internet technologies, more services can be implemented by using a terminal device. In related technologies, many service scenarios include information exchange between users. How to improve information exchange efficiency and convenience has become a problem to be resolved.

SUMMARY

In view of this, the present application provides service processing methods and apparatuses.

Specifically, the present application is implemented by using the following technical solutions:

A service processing method is provided, and the method includes: receiving a service object acquisition request sent by a service request end, where the service object acquisition request includes an initiation location of the service request end; receiving service object recommendation information sent by a service response end, where the service object recommendation information includes a response location of the service response end; and when a distance between the initiation location and the response location is less than a predetermined distance, and a time difference between a requesting time of the service object acquisition request and a sending time of the service object recommendation information is less than a predetermined time difference, sending a target service object that matches the service object recommendation information to the service request end.

Optionally, the method further includes: after receiving the service object acquisition request sent by the service request end, storing a mapping relationship between identifier information of the service request end and the initiation location; and the sending a target service object that matches the service object recommendation information to the service request end includes: sending the target service object that matches the service object recommendation information to the service request end based on the identifier information of the service request end.

Optionally, the sending a target service object that matches the service object recommendation information to the service request end includes: when the service object recommendation information includes a service object, sending the included service object as the target service object to the service request end; or when the service object recommendation information does not include a service object, determining a service object bound to the service response end based on identifier information of the service response end, and sending the bound service object as the target service object to the service request end.

Optionally, the service object recommendation information is sent after the service response end receives a predetermined gesture instruction.

Optionally, the service object acquisition request is a self-select stock acquisition request, the service object recommendation information is self-select stock recommendation information, and the target service object is a self-select stock.

A service processing apparatus is provided, and the apparatus includes: a request receiving unit, configured to receive a service object acquisition request sent by a service request end, where the service object acquisition request includes an initiation location of the service request end; a response receiving unit, configured to receive service object recommendation information sent by a service response end, where the service object recommendation information includes a response location of the service response end; and a service recommendation unit, configured to send a target service object that matches the service object recommendation information to the service request end when a distance between the initiation location and the response location is less than a predetermined distance and a time difference between a requesting time of the service object acquisition request and a sending time of the service object recommendation information is less than a predetermined time difference.

Optionally, the apparatus further includes: a location storage unit, configured to store a mapping relationship between identifier information of the service request end and the initiation location after the service object acquisition request sent by the service request end is received, where the service recommendation unit is configured to send the target service object that matches the service object recommendation information to the service request end based on the identifier information of the service request end.

Optionally, the service recommendation unit is configured to: send an included service object as the target service object to the service request end when the service object recommendation information includes the service object; or determine a service object bound to the service response end based on identifier information of the service response end and send the bound service object as the target service object to the service request end when the service object recommendation information does not include a service object.

Optionally, the service object recommendation information is sent after the service response end receives a predetermined gesture instruction.

Optionally, the service object acquisition request is a self-select stock acquisition request, the service object recommendation information is self-select stock recommendation information, and the target service object is a self-select stock.

It can be seen from the previous descriptions that, in the present application, after receiving the service object recommendation information sent by the service response end, the server can send the target service object that matches the service object recommendation information to a service request end that satisfies both a distance constraint and a time constraint. No friend addition operation is needed in the whole service object recommendation process. For a user, an operation is convenient and information exchange efficiency is relatively high.

BRIEF DESCRIPTION OF DRAWINGS

FIG. 6 is a flowchart illustrating an example of a computer-implemented method for exchanging information between users of a social networking service, according to an implementation of the present disclosure.

DESCRIPTION OF IMPLEMENTATIONS

Example implementations are described here in detail, and examples are presented in the accompanying drawings. When the following description relates to the accompanying drawings, unless specified otherwise, same numbers in different accompanying drawings represent a same element or similar elements. The following example implementations do not represent all implementations in accordance with the present application. Instead, the implementations are merely examples of apparatuses and methods in accordance with some aspects of the present application that are described in detail in the appended claims.

The terms used in the present application are merely for illustrating implementations, and are not intended to limit the present application. The terms "a", "the", and "this" of singular forms used in the present application and the appended claims are also intended to include plural forms, unless otherwise specified in the context. It should be further understood that, the terms "and" and "or" used in this specification indicate and include any or all possible combinations of one or more related items.

It should be understood that although terms "first", "second", "third", etc. may be used in the present application to describe various types of information, the information is not limited by these terms. These terms are merely used to differentiate information of a same type. For example, without departing from the scope of the present application, first information can be referred to as second information. Similarly, second information can be referred to as first information. Depending on the context, for example, word "if" used here can be explained as "while", "when", or "in response to determining".

In related technologies, when strangers exchange information, one can share service information with the other party after adding the other party as a friend. However, such implementation is relatively complex, and a user can add the other party as a friend and share service information after performing steps of requesting, confirming, approving, etc. Further, in some service scenarios, strangers have a weak relationship, and two parties that exchange information may not want the other party to be a friend. Therefore, it is not convenient to exchange information through adding friends. Alternatively, a user can orally notify the other party of related service information, and the other party can obtain service information through searching. However, such implementation has low efficiency and accuracy.

The present application provides a service processing solution, so as to more conveniently implement a high-efficiency information exchange process.

Figure 1:
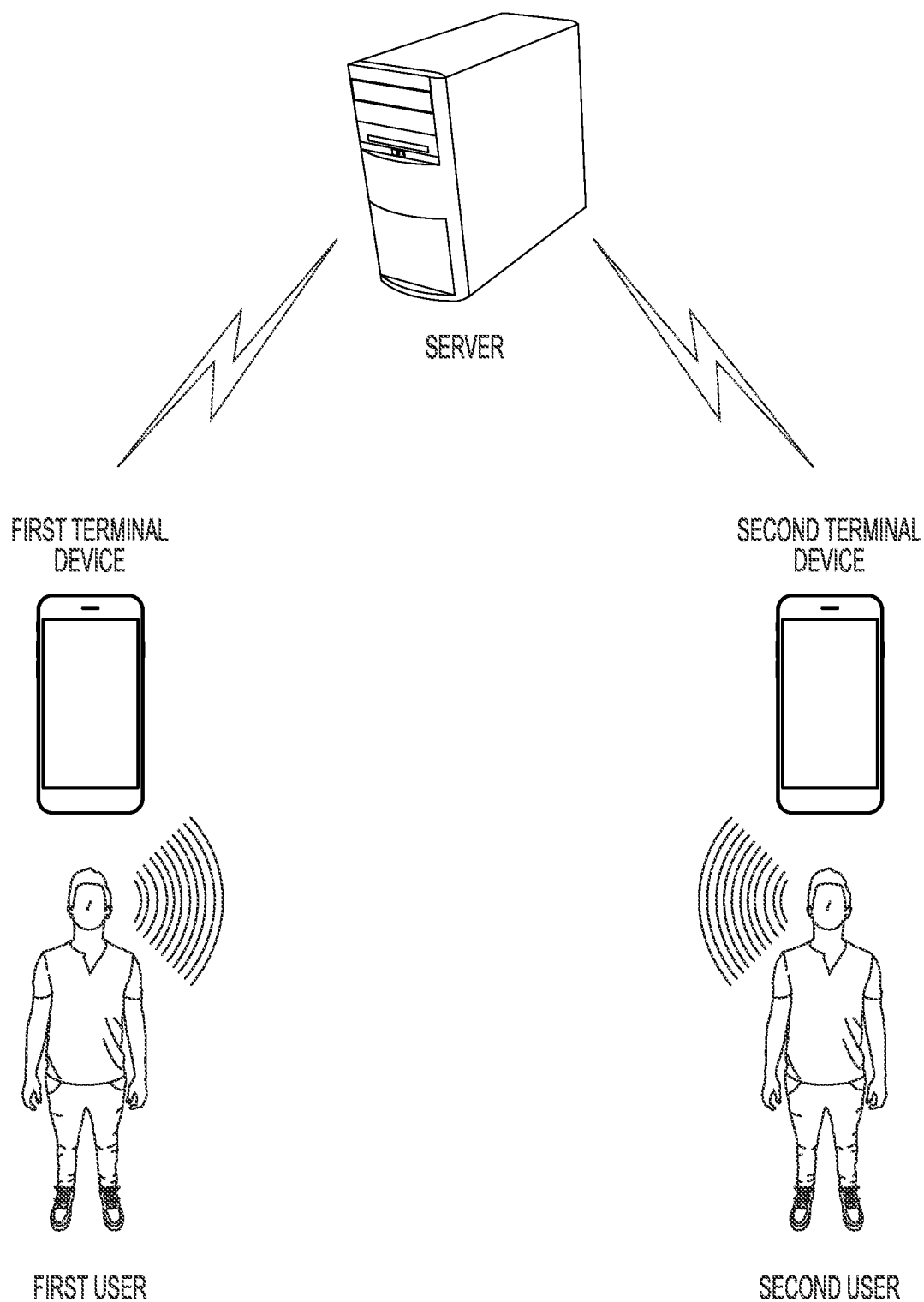
FIG. 1 is a schematic diagram illustrating an application scenario of service processing, according to an example implementation of the present application.

FIG. 1 is a schematic diagram illustrating an application scenario of service processing, according to an example implementation of the present application.

Referring to FIG. 1, a server is usually set up by a service provider. The service provider can provide a user with various services by using the server to implement related service operations. The user can register a corresponding user account on the server in advance. For detailed registration processes, references can be made to implementation methods provided in related technologies. Details are omitted in the present application.

In this implementation of the present application, a terminal device can be an intelligent device that can connect to a network, for example, a mobile phone, a tablet computer, or a personal digital assistant (PDA). The user can interact with the server by using an application (APP) installed on the terminal device, so as to implement various service operations. For ease of description, in subsequent implementations of the present application, processes of interactions between the APP installed on the terminal device and the server are referred to as processes of interactions between the terminal device and the server.

Referring back to FIG. 1, in the example implementation of the present application, a first user performs a related service operation by using a first terminal device. For example, the first user can register a first account on the server in advance, and perform the related service operation based on the first account. A second user performs a related service operation by using a second terminal device. For example, the second user can register a second account on the server in advance, and perform the related service operation based on the second account. In actual applications, the first user and the second user may not register the user accounts, and the server can provide services for the first user and the second user based on service information provided by the first user and service information provided by the second user. Implementations are not limited in the present application.

Figure 2:
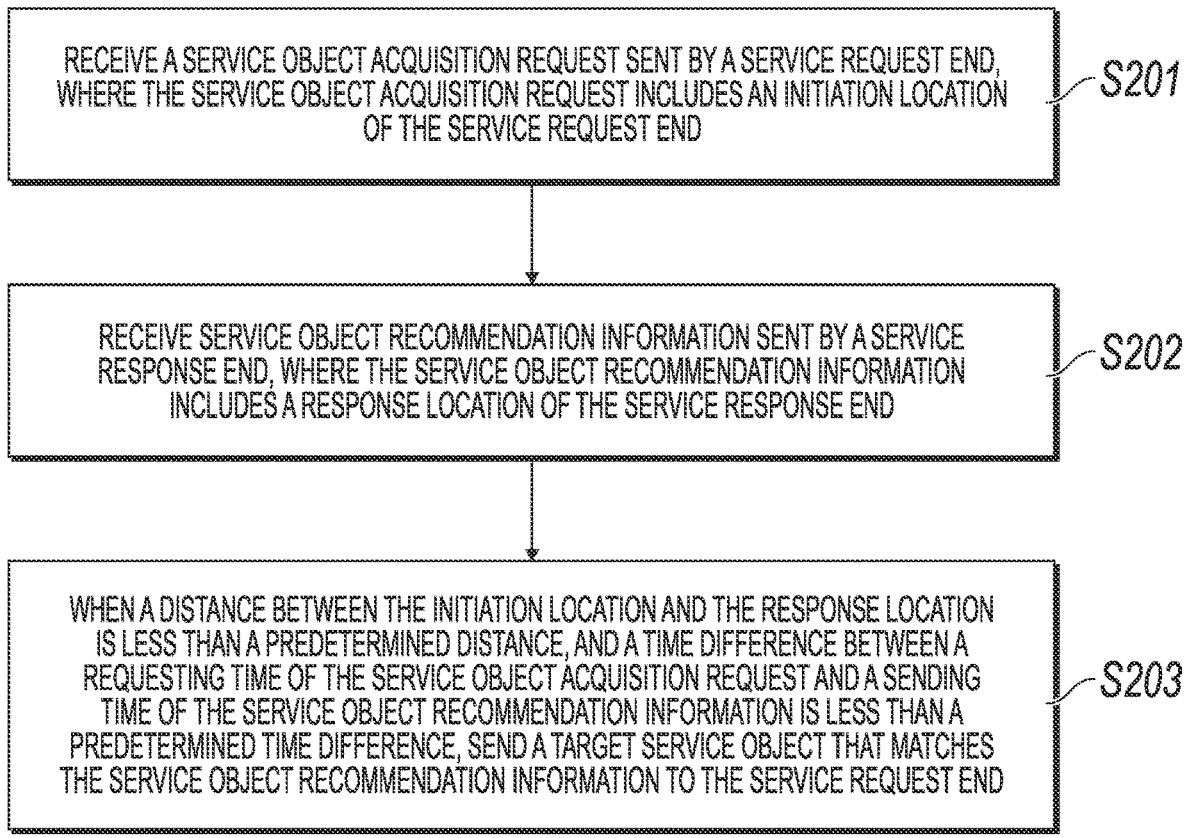
FIG. 2 is a flowchart illustrating a service processing method, according to an example implementation of the present application.

FIG. 2 is a flowchart illustrating a service processing method, according to an example implementation of the present application.

Referring to FIG. 2, the service processing method can be applied to the server shown in FIG. 1, and includes the steps below.

Step 201: Receive a service object acquisition request sent by a service request end, where the service object acquisition request includes an initiation location of the service request end.

In this implementation, the service is usually a service object recommendation service, for example, self-select stock recommendation, Weibo follower recommendation, or friend recommendation.

In this implementation, for ease of differentiation, an acquisition end of the service object is referred to as the service request end, and a user that requests to obtain the service object can send the service object acquisition request to the server by using the service request end. For example, the user that requests to obtain the service object can trigger a service object acquisition function by clicking a predetermined button or entering a predetermined gesture. The service request end can obtain the current initiation location, add the initiation location to the service object acquisition request, and send the service object acquisition request to the server.

In this implementation, after receiving the service object acquisition request, the server can store a mapping relationship between identifier information of the service request end and the initiation location. The identifier information can include a mobile phone number, an account ID, etc.

The application scenario shown in FIG. 1 is used as an example. Assume that the first terminal device is the service request end, the first terminal device can obtain the current initiation location after receiving a request instruction of the first user, add the initiation location to the service object acquisition request, and send the service object acquisition request to the server.

Step 202: Receive service object recommendation information sent by a service response end, where the service object recommendation information includes a response location of the service response end.

In this implementation, for ease of differentiation, a recommendation end of the service object can be referred to as the service response end, and a user that recommends the service object can send the service object recommendation information to the server by using the service response end. For example, after first receiving a related request of the user that requests to obtain the service object, the user that recommends the service object can trigger a service object recommendation function by clicking a predetermined button or entering a predetermined gesture. The service response end can obtain the current response location, and send the response location and a service object that is followed by the service response end and that is used as the recommended service object to the server. The service object can include a self-select stock, a Weibo follower, a friend, etc.

Optionally, in an example of the present application, the service response end can add all service objects followed by the service response end to the service object recommendation information, and send the service object recommendation information to the server. Alternatively, the service response end can add a service object selected by the user to the service object recommendation information, and send the service object recommendation information to the server. Implementations are not limited in the present application.

Using again the application scenario shown in FIG. 1 as an example. Assume that the second terminal device is the service response end, the first user can orally query the second user about information related to a service object of the second user. The second user can input a response instruction for the service object by using the second terminal device, and then the second terminal device can obtain the current response location, add the response location and the service object followed by the second user to the service object recommendation information, and send the service object recommendation information to the server.

Step 203: When a distance between the initiation location and the response location is less than a predetermined distance, and a time difference between a requesting time of the service object acquisition request and a sending time of the service object recommendation information is less than a predetermined time difference, send a target service object that matches the service object recommendation information to the service request end.

In this implementation, after receiving the service object recommendation information sent by the service response end, the server can determine a service request end that satisfies both a distance constraint and a time constraint, and then send the target service object that matches the service object recommendation information to the service request end. The distance constraint can be that the distance between the initiation location and the response location is less than the predetermined distance, and the time constraint can be that the time difference between the requesting time of the service object acquisition request and the sending time of the service object recommendation information is less than the predetermined time difference. The predetermined distance and the predetermined time difference can be set by a developer, for example, 20 meters or 1 minute. Implementations are not limited in the present application.

Optionally, in an example of the present application, after receiving the service object recommendation information sent by the service response end, the server can first determine service request ends that satisfy a distance constraint, and then determine a service request end that satisfies a time constraint in the service request ends that satisfy the distance constraint. In another example of the present application, after receiving the service object recommendation information sent by the service response end, the server can first determine service request ends that satisfy a time constraint, and then determine a service request end that satisfies a distance constraint in the service request ends that satisfy the time constraint. Implementations are not limited in the present application.

Optionally, in an example of the present application, after receiving the service object recommendation information sent by the service response end, the server can first determine a service object that matches the service object recommendation information. For ease of description, the service object that matches the service object recommendation information can be referred to as the target service object. After determining the target service object, the server can send the target service object to the service request end that satisfies both the distance constraint and the time constraint. For example, the target service object is sent to the service request end based on the account ID of the service request end. The server can determine, in the following two manners, the target service object that matches the service object recommendation information.

In the first manner, the service object recommendation information includes the target service object. In this implementation, after receiving the service object recommendation information, the server can first determine whether the service object recommendation information includes a service object, for example, whether the service object recommendation information includes identifier information of a service object. If yes, the server can determine the service object included in the service object recommendation information as the target service object that matches the service object recommendation information, and send the target service object to the service request end.

In the second manner, the service object recommendation information does not include the target service object. After receiving the service object recommendation information, if the service object recommendation information is determined as not including a service object, the server can obtain identifier information of the service response end, obtain a service object bound to the service response end based on the identifier information, and send the bound service object as the target service object to the service request end. The server can obtain the service object bound to the identifier information based on the identifier information of the service response end from a database or a platform that stores a service object. Implementations are not limited in the present application.

It can be seen from the previous descriptions that, in the present application, after receiving the service object recommendation information sent by the service response end, the server can send the target service object that matches the service object recommendation information to the service request end that satisfies both the distance constraint and the time constraint. No friend addition operation is needed in the whole service object recommendation process. For a user, an operation is convenient and information exchange efficiency is relatively high.

Optionally, in another example of the present application, after sending the target service object to the service request end, the server can delete the stored mapping relationship between the identifier information of the service request end and the initiation location. Details are omitted in the present application.

The following describes an implementation process of the present application with reference to a specific application scenario.

Figure 3:
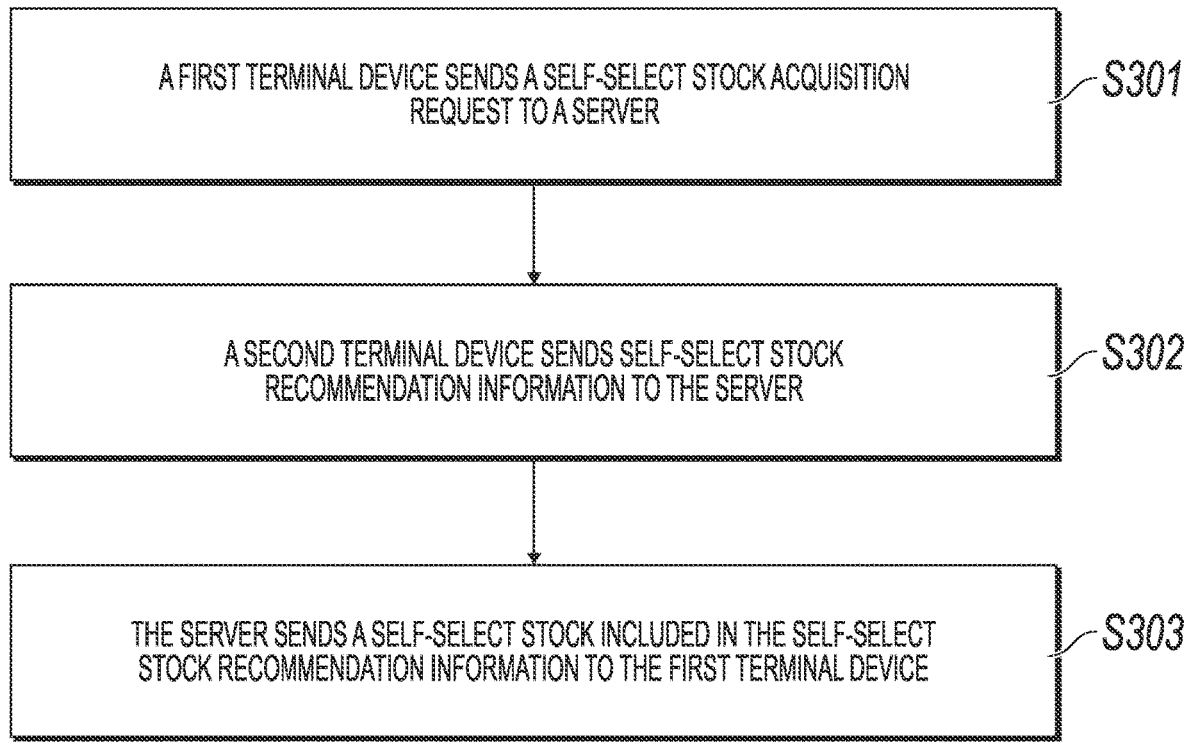
FIG. 3 is a flowchart illustrating another service processing method, according to an example implementation of the present application.

Assume that a service related to the present application is a self-select stock recommendation service, a target service object is a self-select stock, the service object acquisition request is a self-select stock acquisition request, and the service object recommendation information is self-select stock recommendation information. Using FIG. 1 as an example. Assume that the first terminal device is a service request end, and the second terminal device is a service response end. Referring to FIG. 3, the service processing method provided in the present application can include the steps below.

Step 301: The first terminal device sends a self-select stock acquisition request to a server.

In this implementation, assume that the first user and the second user are strangers met in a stock trading hall, and the first user wants to know a self-select stock followed by the second user, the first user can trigger a self-select stock acquisition function, for example, the first user can click a predetermined button in stock software, and then the first terminal device can obtain a current initiation location, add the initiation location to the self-select stock acquisition request, and send the self-select stock acquisition request to the server.

Step 302: The second terminal device sends self-select stock recommendation information to the server.

In this implementation, the first user can orally notify the second user that the first user wants to learn the self-select stock followed by the second user. If the second user is willing to notify the first user of the self-select stock, the second user can trigger a self-select stock recommendation function by turning the mobile phone, and then the second terminal device can obtain a current response location, add the response location and the self-select stock followed by the second user to the self-select stock recommendation information, and send the self-select stock recommendation information to the server.

Step 303: The server sends a self-select stock included in the self-select stock recommendation information to the first terminal device.

In this implementation, after receiving the self-select stock recommendation information sent by the second terminal device, the server can determine a service request end that is less than 10 meters from the second terminal device as the first terminal device, where a time difference between a requesting time of a received self-select stock acquisition request and a sending time of the self-select stock recommendation information is less than 1 minute, and then send the self-select stock that is followed by the second user and included in the self-select stock recommendation information to the first terminal device. After receiving the self-select stock, the first terminal device can display the self-select stock to the first user, and the first user can follow the self-select stock of the second user.

In the previous implementation, the server can implement the self-select stock recommendation process by using the method provided in the method implementation shown in FIG. 2. Details are not described here again.

Corresponding to the implementation of the previous service processing method, the present application further provides an implementation of a service processing apparatus.

Figure 4:
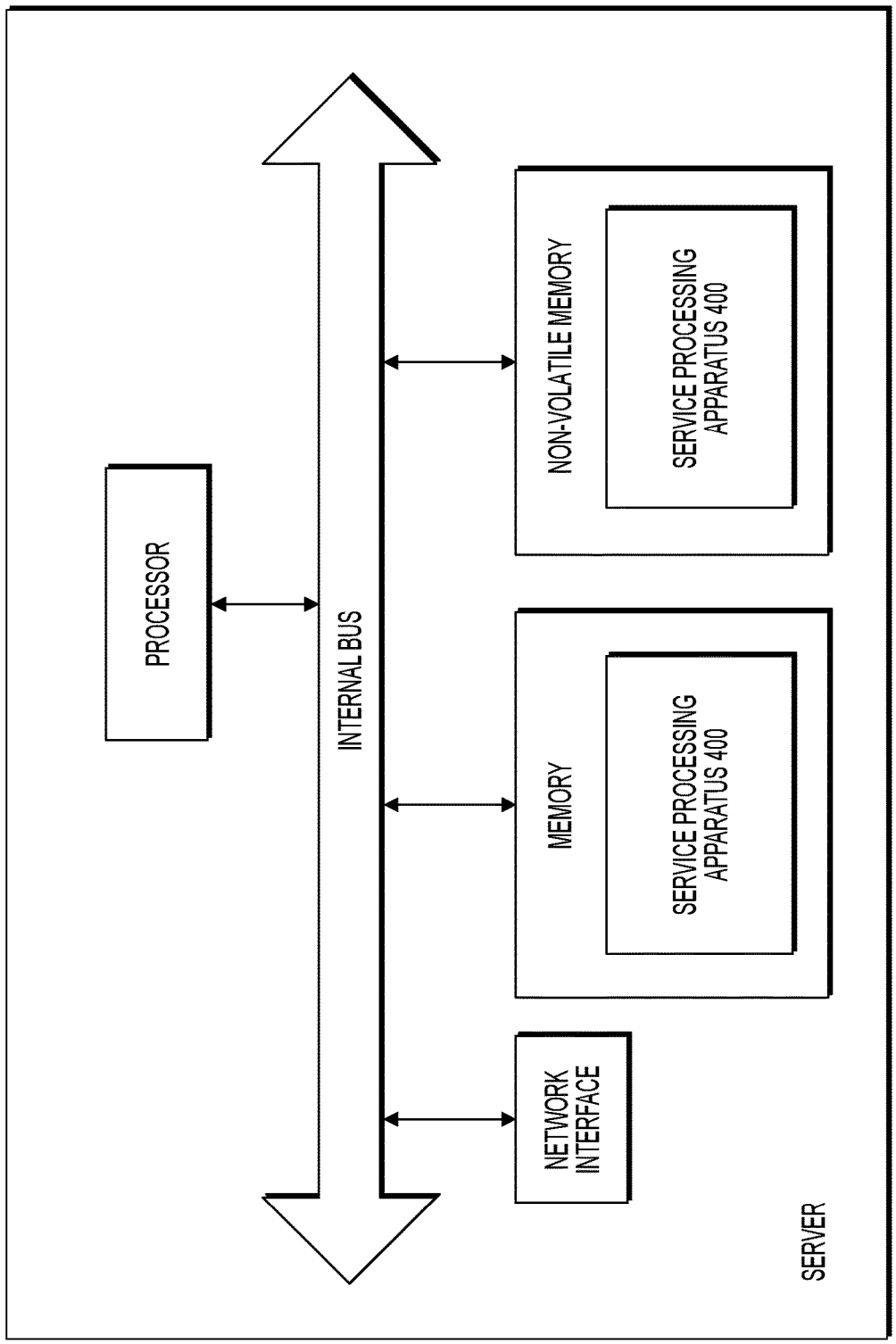
FIG. 4 is a schematic structural diagram illustrating a service processing apparatus, according to an example implementation of the present application.

The implementation of the service processing apparatus provided in the present application can be applied to a server. The apparatus implementation can be implemented by using software, hardware, or a combination of hardware and software. Software implementation is used here as an example. As a logical apparatus, the software is formed by reading a corresponding computer program instruction in a non-volatile memory and running the instruction in a memory by a processor in a server in which the software is located. In terms of hardware implementation, as shown in FIG. 4, FIG. 4 is a diagram illustrating a hardware structure of a server in which a service processing apparatus in the present application is located. In addition to a processor, a memory, a network interface, and a non-volatile memory shown in FIG. 4, the server in which the apparatus according to this implementation is located can also include other hardware based on actual functions of the server. Details are omitted here for simplicity.

Figure 5:
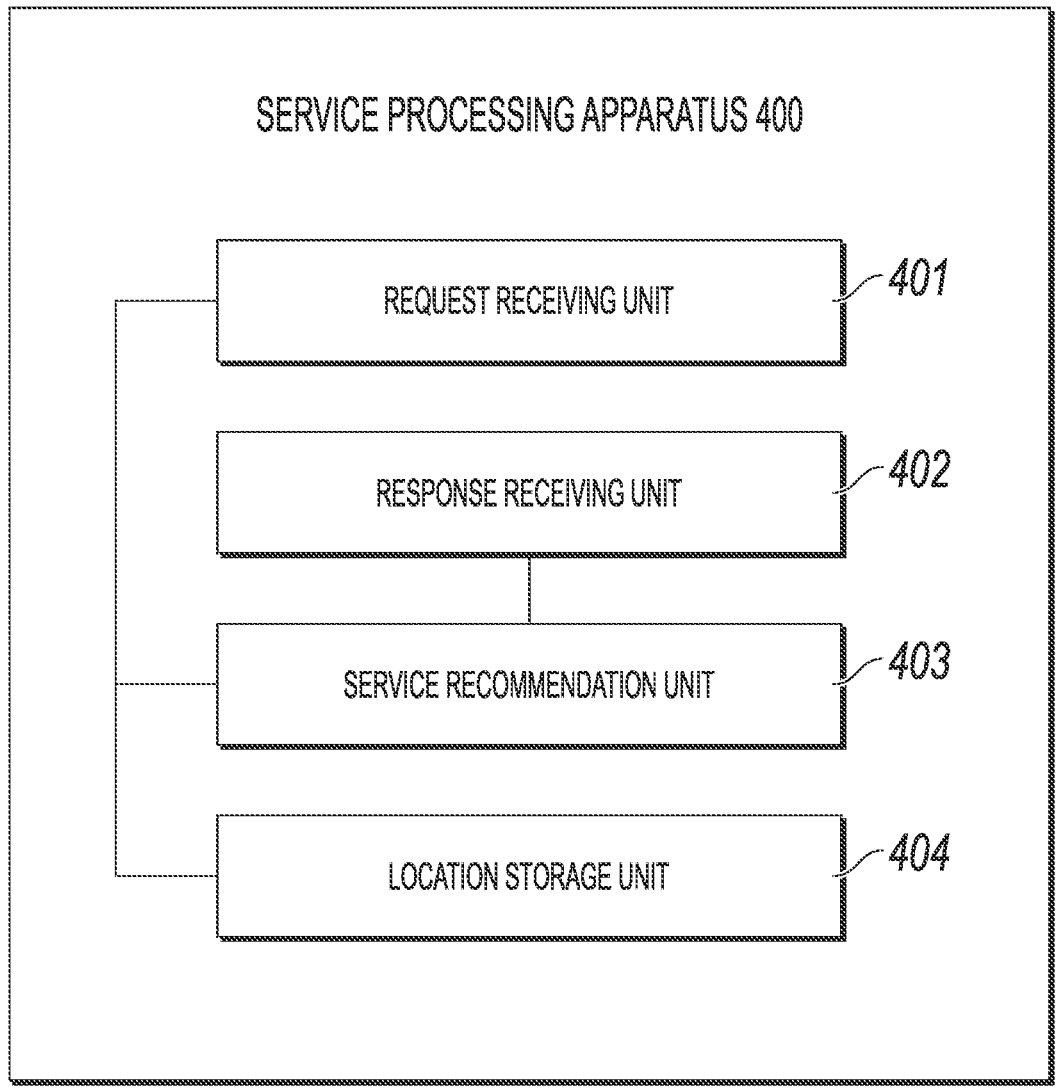
FIG. 5 is a schematic structural diagram illustrating a service processing apparatus, according to an example implementation of the present application.

FIG. 5 is a schematic structural diagram illustrating a service processing apparatus, according to an example implementation of the present application.

Referring to FIG. 5, the service processing apparatus 400 can be applied to the server shown in FIG. 4. The service processing apparatus 400 includes a request receiving unit 401, a response receiving unit 402, a service recommendation unit 403, and a location storage unit 404.

The request receiving unit 401 is configured to receive a service object acquisition request sent by a service request end, where the service object acquisition request includes an initiation location of the service request end.

The response receiving unit 402 is configured to receive service object recommendation information sent by a service response end, where the service object recommendation information includes a response location of the service response end.

The service recommendation unit 403 is configured to send a target service object that matches the service object recommendation information to the service request end when a distance between the initiation location and the response location is less than a predetermined distance and a time difference between a requesting time of the service object acquisition request and a sending time of the service object recommendation information is less than a predetermined time difference.

The location storage unit 404 is configured to store a mapping relationship between identifier information of the service request end and the initiation location after the service object acquisition request sent by the service request end is received.

The service recommendation unit 403 is configured to send the target service object that matches the service object recommendation information to the service request end based on the identifier information of the service request end.

Optionally, the service recommendation unit 403 is configured to: send an included service object as the target service object to the service request end when the service object recommendation information includes the service object; or determine a service object bound to the service response end based on identifier information of the service response end and send the bound service object as the target service object to the service request end when the service object recommendation information does not include a service object.

Optionally, the service object recommendation information is sent after the service response end receives a predetermined gesture instruction.

Optionally, the service object acquisition request is a self-select stock acquisition request, the service object recommendation information is self-select stock recommendation information, and the target service object is a self-select stock.

For detailed implementation processes of units in the apparatus, references can be made to corresponding method implementations described earlier. Details are omitted here for simplicity.

The apparatus implementation can correspond to the earlier described method implementation. For related parts, references can be made to corresponding descriptions in the method implementations. The described apparatus implementation is merely an example. The units described as separate parts may or may not be physically separate, and parts displayed as units may or may not be physical units, can be located in one position, or can be distributed on a plurality of network units. Some or all the modules can be selected based on actual implementations, to achieve the objectives of the solutions of the present application. A person of ordinary skill in the art can understand and implement the implementations of the present application without creative efforts.

The previous descriptions are merely example implementations of the present application, but are not intended to limit the present application. Any modification, equivalent replacement, or improvement made without departing from the spirit and principle of the present application should fall within the protection scope of the present application.

FIG. 6 is a flowchart illustrating an example of a computer-implemented method 600 for exchanging information between users of a social networking service, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

Social networking services fall under a broad category of internet-based services that facilitate communication, sharing, and exchanging of information between users of the service. Examples of social networking services include Facebook, Twitter, LinkedIn, Reddit, Pinterest, Instagram, Google+, Weibo, WeChat, KakaoTalk, WhatsApp, Line, and SnapChat. As popularity of various social networking services continues to grow, people increasingly utilize social networking services to share and exchange information with others in both digital encounters and physical encounters. For example, two strangers may meet and strike a conversation, and during the course of the conversation, the two people may wish to give, receive, share, or exchange various information. People may wish to share, among others, a variety of recommendations with one another, such as a specific individual or an organization to follow on a social networking service, a popular restaurant, a product, a service, a news article, or a stock.

When sharing digital information, the exchange of information is typically significantly easier to perform using digital methods, such as by sending a message through a social networking service, or sending a recommendation directly to a user of the social networking service such that the user receiving the recommendation can directly access or add the recommendation to their social networking account without additional typing or searching, which can be prone to errors. However, various social networking services may require the two users to first be associated with one another within the social networking service, such as being 'friends' or 'connections,' prior to allowing communication to take place between the two users. In certain situations, such as in encounters between strangers, the users may wish to share information but not wish to establish a persistent connection through establishing a friendship or a connection on the social networking service. Further, even in cases where social networks allow users to exchanges information based on their accounts or IDs without establishing a friendship or a connection, users may not wish to share their social networking accounts or IDs with strangers or acquaintances, so as to maintain privacy of their social networks, for example. As such, a method of facilitating exchange of information between users of a social networking service in an in-person encounter without establishing connections or sharing account information, is desired.

At 602, a content acquisition request for acquiring a content from a social networking service is received from a first terminal associated with the social networking service. The content acquisition request includes a first location of the first terminal when the content acquisition request is generated by the first terminal. This step may be similar to the step S201 of FIG. 2. The user of the first terminal, during a conversation with another person, may wish to receive a content from the other person through the social networking service that both the user and the other person uses. The other person may agree to share the content with the user of the first terminal during the conversation. As a step in receiving the content, the first terminal of the user sends the content acquisition request to, for example, a server associated with the social networking service. The sending of the content acquisition request by the first terminal may be initiated by an action of the user of the first terminal, such as pressing a button of or providing a preset gesture input to an app associated with the social networking service.

Sending of the content acquisition request by the first terminal may be considered as an indication to the social networking service that the first terminal is actively seeking to receive a content. The social networking service can provide a content to the first terminal based on criteria that will be described below.

The content to be acquired from the social networking service is generally any information that can be shared digitally, and may include, for example, specific individual or an organization to follow on a social networking service, a popular restaurant, a product, a service, a news article, or a stock.

The first location of the first terminal when the content acquisition request is generated by the first terminal is included in the content acquisition request. The first location can be determined or generated, for example, based on GPS location data, cell-tower triangulation data, WiFi-assisted location determination, Bluetooth-assisted location/proximity determination, or various indoor positioning techniques.

In some implementations, the content acquisition request includes a first time corresponding to a time when the content acquisition request is generated by the first terminal.

From 602, the method 600 proceeds to 604.

At 604, a content recommendation message is received from a second terminal associated with the social networking service. The content recommendation message includes a recommended content information and a second location of the second terminal when the content recommendation message is generated by the second terminal. This step may be similar to the step S202 of FIG. 2. As the user of the second terminal has agreed to share the content with the user of the first terminal, the user of the second terminal may proceed to provide the content to be shared by sending, through the second terminal, the content recommendation message to, for example, the server associated with the social networking service. The sending of the content recommendation message by the second terminal may be initiated by an action of the user of the second terminal, such as pressing a button of or providing a preset gesture input to an app associated with the social networking service.

The recommended content information is included in the content recommendation message. In general, the recommended content information is any information related to the content to be shared with the first terminal.

The second location of the second terminal when the content recommendation message is generated by the second terminal is included in the content recommendation message. The second location can be determined or generated, for example, based on GPS location data, cell-tower triangulation data, WiFi-assisted location determination, Bluetooth-assisted location/proximity determination, or various indoor positioning techniques.

In some implementations, the content recommendation message includes a second time corresponding to a time when the content recommendation message is generated by the second terminal.

From 604, the method 600 proceeds to 606.

At 606, a server of the social networking service determines that (i) the first location of the first terminal and the second location of the second terminal are within a preset range, and (ii) a first time of the content acquisition request and a second time of the content recommendation message are within a preset time difference. At this point in the method 600, the first terminal has sent the content acquisition request to the social networking service, which informs the social networking service of the first terminal's intent to acquire content from the social networking service. Further, the second terminal has sent the content recommendation message to the social networking service, which provides the social networking service with content that can be shared with its users. It is to be noted that the content recommendation message does not identify the intended recipient of the recommended content. Due to the scale of a typical social networking service, numerous content acquisition requests and numerous content recommendation messages may be received by the social networking service at any given time. As such, simply providing content associated with the content recommendation message to terminals that have sent the content acquisition requests is likely to lead to sharing of recommended contents with unintended recipients.

To mitigate such unintended sharing of the recommended content and facilitate sharing of the recommended content with the user of the first terminal with whom the user of the second terminal is interacting, criteria based on spatial proximity and temporal proximity can be used. The spatial proximity criterion is based on whether the first location of the first terminal and the second location of the second terminal are within a preset range from one another. The preset range, for example, can be within 1 m, 2 m, 5 m, 10 m, or 20 m. By limiting sharing of the recommended content to only the users who are in spatial proximity to the second terminal when the content acquisition request and the recommended content message are generated, it may be possible to substantially reduce the occurrence of unintended sharing.

The temporal proximity criterion is based on whether a first time of the content acquisition request and a second time of the content recommendation message is within a preset time difference. The preset time difference can be, for example, 30 seconds, 1 minute, 2 minutes, or 3 minutes. By limiting the sharing of the recommended content to only the users who have sent the content acquisition request within the preset time difference from the second time associated with the recommended content message, it may be possible to further reduce the occurrence of unintended sharing. In general, the temporal criterion may be satisfied irrespective of whether the first time is before the second time, or vice versa.

In general, the first time of the content acquisition request and the second time of the content recommendation message can be associated with the time of generation of the request and the message at the respective terminals, or be alternatively associated with the time of receipt of the request and the message by the server of the social networking service.

In general, the determination of spatial proximity and the determination of temporal proximity can be done sequentially or in parallel. In sequential implementations, the performance of the determination of temporal proximity can be conditioned upon meeting the spatial proximity criterion, or vice versa.

In some implementations, the preset range can vary depending on the accuracy, variability, reliability, or confidence of the first and second locations. For example, when the first and second terminals are located indoors, the accuracy of GPS-based location information may be diminished. In such cases, it may be advantageous to increase the preset range to account for the reduced accuracy of the location information to improve robustness of the method.

From 606, the method 600 proceeds to 608.

At 608, the server transmits a target content associated with the recommended content information of the content recommendation message to the first terminal, in response to determining that (i) the first location of the first terminal and the second location of the second terminal are within the preset range, and (ii) the first time of the content acquisition request and the second time of the content recommendation message are within the preset time difference. This step may be similar to the step S203 of FIG. 2.

A mapping between the first location of the first terminal and first identification information associated with the first terminal that sent the content acquisition request can be used by the server of the social networking service in transmitting the target content to the first terminal. Identification information of a terminal can include a mobile phone number or a social networking service account ID. As such, in some implementations, the method 600 includes a step of: in response to receiving, from the first terminal associated with the social networking service, the content acquisition request for acquiring a content from the social networking service, storing first mapping information associating first identification information of the first terminal with the first location of the first terminal, and the step of transmitting, by the server to the first terminal, the target content includes a step of: transmitting the target content to the first terminal based on the first identification information of the first terminal.

A mapping between a content acquisition request and first identification information associated with the first terminal that sent the content acquisition request can be used by the server of the social networking service in transmitting the target content to the first terminal. As such, in some implementations, the method 600 includes a step of: in response to receiving, from the first terminal associated with the social networking service, the content acquisition request for acquiring a content from the social networking service, storing first mapping information associating first identification information of the first terminal with the content acquisition request, and the step of transmitting, by the server to the first terminal, the target content includes a step of: transmitting the target content to the first terminal based on the first identification information of the first terminal.

The target content is the content being transmitted to the first terminal, and is associated with the recommended content information. In some implementations, the recommended content information can be, or include, the recommended content itself, such as specific individual or an organization to follow on a social networking service, a popular restaurant, a product, a service, a news article, or a stock. In some implementations, the recommended content information can be information useable by the social networking service to identify, obtain, or retrieve the recommended content. For example, the recommended content to be shared with the first terminal may not be stored on the second terminal itself. This may be the case, for example, when the recommended content is stored in a content database associated with the social networking service. In such cases, second identification information of the second terminal can be used to search a content database associated with the social networking service for content entries associated with the second identification information. Examples of content entries associated with the second identification information include content entries generated by the second terminal, content entries generated by the user of the second terminal, content entries that are 'bound' to the second terminal, and content entries that are saved or otherwise designated for later retrieval by the user of the second terminal. As such, in some implementations, the step 608 may further include the step of: determining whether the recommended content information comprises a first content; in response to determining that the recommended content information comprises the first content, transmitting the first content to the first terminal as the target content; in response to determining that the recommended content information does not comprise the first content, determining a second content associated with the second terminal based on second identification information of the second terminal; and in response to determining the second content associated with the second terminal, transmitting the second content to the first terminal as the target content.

In some implementations, the step of determining the second content associated with the second terminal based on the second identification information of the second terminal includes the steps of: searching a content database associated with the social networking service for content entries associated with the second identification information; determining that at least one entry of the content entries associated with the second identification information corresponds to the recommended content information; and determining the at least one entry associated to be the second content. In some implementations, a content entry may be determined to correspond to the recommended content information when the content entry matches one or more criteria included in the recommended content information. Examples of the criteria included in the recommended content information include content type and content keyword.

In some implementations of the method 600, the recommended content information corresponds to stock recommendation information, and the target content is a stock recommendation.

After 608, the method 600 stops.

The methods disclosed herein allow sharing of contents between users of a social networking service without adding each other as a friend or a connection, which can make content sharing more efficient. Further, the methods allow sharing of contents without designating a recipient, which can improve user convenience. Recipient-less sharing of contents allows content sharing between users of a social networking service while maintaining anonymity in the social networking service. By sharing the target content associated with the recommended content information based on the temporal- and spatial-proximity criteria, unintended sharing of the recommended content can be mitigated.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, by a server, a recommendation request from a first terminal, wherein the recommendation request comprises a first location of the first terminal;
receiving, by the server, a response message corresponding to the recommendation request from a second terminal, wherein the response message comprises a second location of the second terminal, a recommendation content generated based on the recommendation request, and identifier information of the recommendation content;
determining, by the server, that the recommendation content matches the response message using the identifier information of the recommendation content;
in response to determining that the recommendation content matches the response message, determining, by the server, the recommendation content as a target content;
in response to determining the recommendation content as the target content, determining, by the server, that (i) the first location of the first terminal and the second location of the second terminal are within a preset range, and (ii) a first time of the recommendation request and a second time of the response message are within a preset time difference; and in response to determining that (i) the first location of the first terminal and the second location of the second terminal are within the preset range, and (ii) the first time of the recommendation request and the second time of the response message are within the preset time difference, transmitting, by the server, the target content to the first terminal.

2. The computer-implemented method of claim 1, wherein the method comprises:
in response to receiving, from the first terminal associated with a social networking service, a content acquisition request for acquiring a content from the social networking service, storing first mapping information associating first identification information of the first terminal with the first location of the first terminal, and
wherein transmitting, by the server, the target content associated with the response message to the first terminal comprises:
transmitting the target content to the first terminal based on the first identification information of the first terminal.

3. The computer-implemented method of claim 1, wherein the method comprises:
in response to receiving, from the first terminal associated with a social networking service, a content acquisition request for acquiring a content from the social networking service, storing first mapping information associating first identification information of the first terminal with the content acquisition request, and
wherein transmitting, by the server, the target content associated with the response message to the first terminal comprises:
transmitting the target content to the first terminal based on the first identification information of the first terminal.

4. The computer-implemented method of claim 1, wherein transmitting, by the server, the target content associated with the response message to the first terminal comprises:
determining whether recommended content information comprises a first content;
in response to determining that the recommended content information comprises the first content, transmitting the first content to the first terminal as the target content;
in response to determining that the recommended content information does not comprise the first content, determining a second content associated with the second terminal based on second identification information of the second terminal; and
in response to determining the second content associated with the second terminal, transmitting the second content to the first terminal as the target content.

5. The computer-implemented method of claim 4, wherein determining the second content associated with the second terminal based on the second identification information of the second terminal comprises:
searching a content database associated with a social networking service for content entries associated with the second identification information;
determining that at least one entry of the content entries associated with the second identification information corresponds to the recommended content information; and
determining the at least one entry associated to be the second content.

6. The computer-implemented method according to claim 4, wherein the recommended content information corresponds to stock recommendation information, and the target content is a stock recommendation.

7. The computer-implemented method of claim 1, wherein the response message is generated by the second terminal in response to a preset gesture input to the second terminal.

8. A non-transitory, computer-readable medium storing instructions executable by a computer system to perform operations comprising:
receiving, by a server, a recommendation request from a first terminal, wherein the recommendation request comprises a first location of the first terminal;
receiving, by the server, a response message corresponding to the recommendation request from a second terminal, wherein the response message comprises a second location of the second terminal, a recommendation content generated based on the recommendation request, and identifier information of the recommendation content;
determining, by the server, that the recommendation content matches the response message using the identifier information of the recommendation content;
in response to determining that the recommendation content matches the response message, determining, by the server, the recommendation content as a target content;
in response to determining the recommendation content as the target content, determining, by the server, that (i) the first location of the first terminal and the second location of the second terminal are within a preset range, and (ii) a first time of the recommendation request and a second time of the response message are within a preset time difference; and
in response to determining that (i) the first location of the first terminal and the second location of the second terminal are within the preset range, and (ii) the first time of the recommendation request and the second time of the response message are within the preset time difference, transmitting, by the server, the target content associated with the response message to the first terminal.

9. The non-transitory, computer-readable medium of claim 8, wherein the operations comprise:
in response to receiving, from the first terminal associated with a social networking service, a content acquisition request for acquiring a content from the social networking service, storing first mapping information associating first identification information of the first terminal with the first location of the first terminal, and
wherein transmitting, by the server, the target content associated with the response message to the first terminal comprises:
transmitting the target content to the first terminal based on the first identification information of the first terminal.

10. The non-transitory, computer-readable medium of claim 8, wherein the operations comprise:
in response to receiving, from the first terminal associated with a social networking service, a content acquisition request for acquiring a content from the social networking service, storing first mapping information associating first identification information of the first terminal with the content acquisition request, and
wherein transmitting, by the server, the target content associated with the response message to the first terminal comprises:

transmitting the target content to the first terminal based on the first identification information of the first terminal.

11. The non-transitory, computer-readable medium of claim 8, wherein transmitting, by the server, the target content associated with the response message to the first terminal comprises:
 determining whether recommended content information comprises a first content;
 in response to determining that the recommended content information comprises the first content, transmitting the first content to the first terminal as the target content;
 in response to determining that the recommended content information does not comprise the first content, determining a second content associated with the second terminal based on second identification information of the second terminal; and
 in response to determining the second content associated with the second terminal, transmitting the second content to the first terminal as the target content.

12. The non-transitory, computer-readable medium of claim 11, wherein determining the second content associated with the second terminal based on the second identification information of the second terminal comprises:
 searching a content database associated with a social networking service for content entries associated with the second identification information;
 determining that at least one entry of the content entries associated with the second identification information corresponds to the recommended content information; and
 determining the at least one entry associated to be the second content.

13. The non-transitory, computer-readable medium of claim 11, wherein the recommended content information corresponds to stock recommendation information, and the target content is a stock recommendation.

14. The non-transitory, computer-readable medium of claim 8, wherein the response message is generated by the second terminal in response to a preset gesture input to the second terminal.

15. A computer-implemented system, comprising:
 one or more computers; and
 one or more computer memory devices interoperably coupled with the one or more computers and having tangible, non-transitory, machine-readable media storing instructions that, when executed by the one or more computers, perform operations comprising:
  receiving, by a server, a recommendation request from a first terminal, wherein the recommendation request comprises a first location of the first terminal;
  receiving, by the server, a response message corresponding to the recommendation request from a second terminal, wherein the response message comprises a second location of the second terminal, a recommendation content generated based on the recommendation request, and identifier information of the recommendation content;
  determining, by the server, that the recommendation content matches the response message using the identifier information of the recommendation content;
  in response to determining that the recommendation content matches the response message, determining, by the server, the recommendation content as a target content;
  in response to determining the recommendation content as the target content, determining, by the server, that (i) the first location of the first terminal and the second location of the second terminal are within a preset range, and (ii) a first time of the recommendation request and a second time of the response message are within a preset time difference; and
  in response to determining that (i) the first location of the first terminal and the second location of the second terminal are within the preset range, and (ii) the first time of the recommendation request and the second time of the response message are within the preset time difference, transmitting, by the server, the target content associated with the response message to the first terminal.

16. The computer-implemented system of claim 15, wherein the operations comprise:
 in response to receiving, from the first terminal associated with a social networking service, a content acquisition request for acquiring a content from the social networking service, storing first mapping information associating first identification information of the first terminal with the first location of the first terminal, and
 wherein transmitting, by the server, the target content associated with the response message to the first terminal comprises:
 transmitting the target content to the first terminal based on the first identification information of the first terminal.

17. The computer-implemented system of claim 15, wherein the operations comprise:
 in response to receiving, from the first terminal associated with a social networking service, a content acquisition request for acquiring a content from the social networking service, storing first mapping information associating first identification information of the first terminal with the content acquisition request, and
 wherein transmitting, by the server, the target content associated with the response message to the first terminal comprises:
 transmitting the target content to the first terminal based on the first identification information of the first terminal.

18. The computer-implemented system of claim 15, wherein transmitting, by the server, the target content associated with the response message to the first terminal comprises:
 determining whether recommended content information comprises a first content;
 in response to determining that the recommended content information comprises the first content, transmitting the first content to the first terminal as the target content;
 in response to determining that the recommended content information does not comprise the first content, determining a second content associated with the second terminal based on second identification information of the second terminal; and
 in response to determining the second content associated with the second terminal, transmitting the second content to the first terminal as the target content.

19. The computer-implemented system of claim 18, wherein determining the second content associated with the second terminal based on the second identification information of the second terminal comprises:
 searching a content database associated with a social networking service for content entries associated with the second identification information;

determining that at least one entry of the content entries associated with the second identification information corresponds to the recommended content information; and determining the at least one entry associated to be the second content.

20. The computer-implemented system of claim 18, wherein the recommended content information corresponds to stock recommendation information, and the target content is a stock recommendation.

* * * * *